United States Patent [19]

Chayka et al.

[11] 3,882,597
[45] May 13, 1975

[54] METHOD FOR MAKING A TEST PROBE FOR SEMICONDUCTOR DEVICES

[75] Inventors: George A. Chayka, Northampton; Eric J. Persson, Bethlehem; Norbert M. Ziobro, Dupont, all of Pa.

[73] Assignee: Western Electric Co., Inc., New York, N.Y.

[22] Filed: Jan. 31, 1974

[21] Appl. No.: 438,319

Related U.S. Application Data

[62] Division of Ser. No. 209,243, Dec. 17, 1971, Pat. No. 3,810,016.

[52] U.S. Cl. .............. 29/624; 29/203 B; 29/203 D; 29/626
[51] Int. Cl. ........................................... H05k 3/00
[58] Field of Search ....... 29/472.9, 481, 475, 203 B, 29/203 D, 203 R, 576, 589, 590, 591, 624, 625, 626, 628; 72/DIG. 10; 113/119

[56] References Cited
UNITED STATES PATENTS

| | | | |
|---|---|---|---|
| 3,377,514 | 4/1968 | Ruehlemann | 324/158 F |
| 3,445,766 | 5/1969 | Valliere et al. | 324/72.5 |
| 3,445,770 | 5/1969 | Harmon | 324/158 |
| 3,484,533 | 12/1969 | Kauffman | 29/626 |
| 3,537,175 | 11/1970 | St. Clair et al. | 29/590 |
| 3,613,001 | 10/1971 | Hostetter | 324/72.5 |
| 3,702,439 | 11/1972 | McGahey et al. | 324/158 P |
| 3,803,709 | 4/1974 | Beltz et al. | 29/626 X |

FOREIGN PATENTS OR APPLICATIONS

| | | | |
|---|---|---|---|
| 1,910,314 | 3/1973 | Germany | 324/158 P |

*Primary Examiner*—Al Lawrence Smith
*Assistant Examiner*—Margaret M. Joyce
*Attorney, Agent, or Firm*—G. W. Houseweart; P. J. Tribulski, Jr.

[57] ABSTRACT

An intricate micro-probe for testing beam-lead semiconductor devices such as integrated circuits is formed from a molded insulator, a die-cut compensating member and photo-etched contact elements. The configuration of the various elements of the probe is such that mechanized fabrication and assembly of the small probe are possible. The contact elements are photo-etched from a blank which also yields a connected frame having a unique expansion feature permitting three-dimensional shaping of the elements without stretching the elements. The contact elements are thermally embedded into the plastic insulator. A shaping of the contact elements is accomplished with a pyramidal shaping tool and a cut-off blade which trims the contact elements against the pyramidal shaping tool.

15 Claims, 17 Drawing Figures

METHOD FOR MAKING A TEST PROBE FOR SEMICONDUCTOR DEVICES

This is a division, of application Ser. No. 209,243 filed Dec. 17, 1971, now U.S. Pat. No. 3,810,016, issued May 7, 1974.

BACKGROUND OF THE INVENTION

1. Field of the Invention

This invention relates to probe-testing of beam-lead semiconductor devices. More particularly, the invention relates to an improved miniature probe and an improved technique for fabrication of the probe.

2. Description of the Prior Art

Automatic testing machines have long been employed for testing of beam-lead semiconductor devices, such as integrated circuits. Such machines typically utilize an indexable pedestal which sequentially indexes arrays of beam-lead devices under a fixed probe ring. The probe ring is usually assembled from a series of discrete and separately adjustable needle-like probes which contact each of the extremely small beam-leads of a device during a test.

A very significant improvement to the probe-tester design was made when a very small composite probe unit was developed which eliminated the need for discrete and individually adjustable needle-like probes. The small, intricate composite probe unit is described in an application for U.S. Pat., Ser. No. 63,232 filed in the names of B. H. McGahey and J. W. West on Aug. 12, 1970 now U.S. Pat. No. 3,702,439 issued Nov. 7, 1972 and assigned to the assignee of record of this application.

While contributing very substantially to the art of probe-testing semiconductor devices, the probe unit described in the above-mentioned patent application was not fully amenable to mechanized fabrication techniques. In order to achieve a desirable low cost of the probe units, it is necessary to develop a design which is amenable to mechanized fabrication techniques and also to devise the techniques for assembly of the probes.

SUMMARY OF THE INVENTION

It is, therefore, an object of the invention to provide an improved test probe for testing semiconductor articles.

Another object of the invention is to provide a test probe which is amenable to mechanized fabrication and assembly techniques.

A further object of the invention is to provide efficient and accurate techniques and apparatus for assembling such probes.

These objectives are achieved by providing a probe design in which an insulator is formed of thermoplastic material and contact elements are embedded into the surface of the insulator for retention therein. The contact elements are produced by photo-etching a planar, metallic member to produce a frame portion and an expansion portion connecting the contact elements with the frame portion. Shaping of the contact elements into a non-planar configuration is performed without stretching of the contact elements because of the unique expansion arrangement. Formation of contact tips on the contact elements is accomplished by sliding an inclined bearing face of a forming member against free ends of contact elements. This face also acts as a backup for a cutoff blade, which trims the free ends to proper length.

BRIEF DESCRIPTION OF THE DRAWINGS

Other objects and features of the present invention will be more readily understood from the following detailed description of specific embodiments thereof, when read in conjunction with the appended drawings in which.

DETAILED DESCRIPTION

Figure 1:
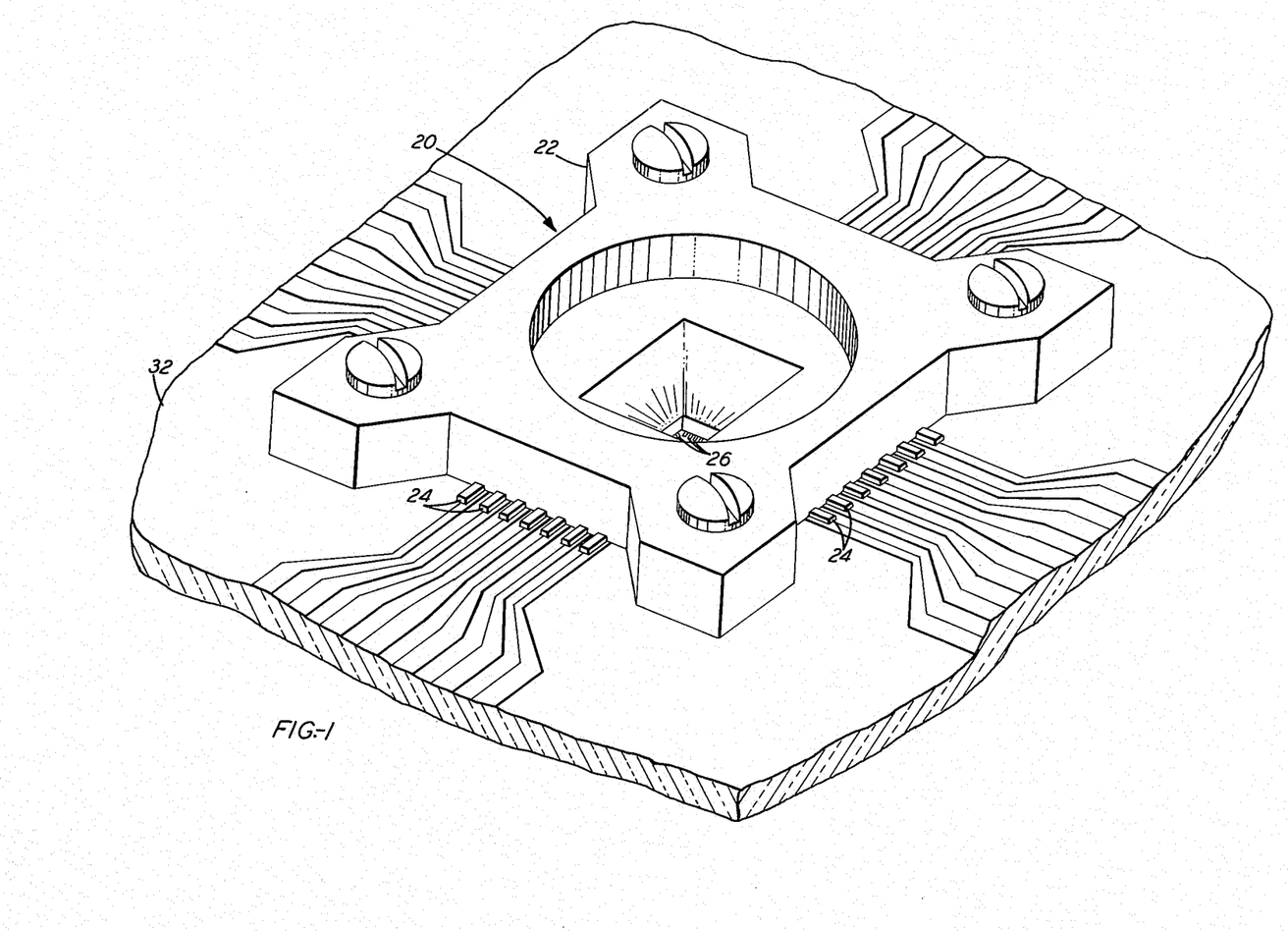
FIG. 1 is a perspective view of an inventive miniature testing probe.

Shown in FIG. 1 is a micro-probe assembly, designated generally by the numeral 20, which has been fabricated and positioned for use in accordance with this invention. The probe assembly 20 is provided with a picture frame-like insulator 22 and a plurality of contact elements 24. Each of the contact elements is shaped to provide a contact tip 26 which engages in individual very small beam-lead 28 of a beam-lead semiconductor device or an integrated circuit chip 30 as shown more clearly in FIG. 2. The beam-leads are typically about 0.0045 inch long and have a cross-sectional area of only about 0.002 inch × about 0.0007 inch. The spacing between the leads may be as little as about 0.005 inch center-to-center.

Figure 2:
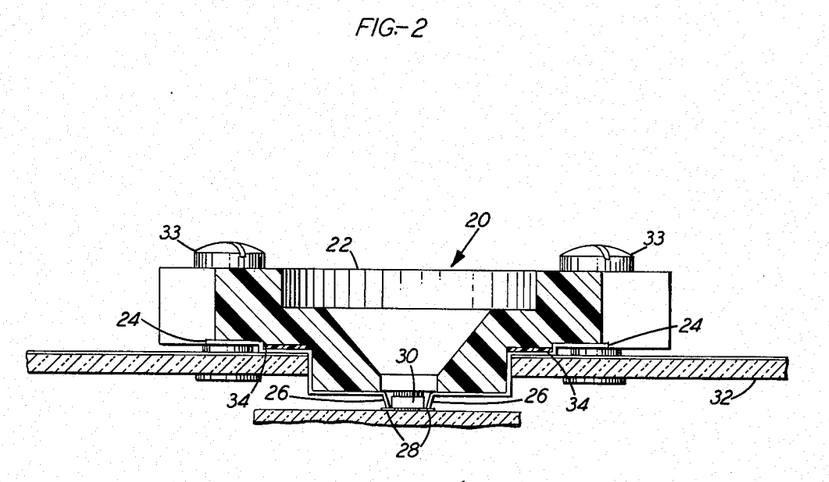
FIG. 2 is a cross-sectional view of the inventive testing probe of FIG. 1 which is engaged with a beam-lead integrated circuit.

The probe assembly 20 is mounted to a planar test-set input adapter 32. Each of the elements 24 contacts a portion of a printed circuit pattern on the adapter 32. To assure intimate contact between the elements 24 and the appropriate portion of the adapter 32, the probe assembly 20 is provided with a resilient compensating member 34. The member 34 compensates for any variations of thickness of either the contact elements or the metallic pattern on the adapter 32. Additionally, the member 34 provides compensation for any waviness in either the insulator 22 or the adapter 32. Thus, when the probe assembly 20 is clamped to the adapter 32 with screws 33 the compensating member 34 assures good electrical contact between the contact elements 24 and the metallic pattern on the adapter.

When the probe assembly 20 is engaged with one of the chips 30, the contact tips 26 make a slight scrubbing motion across the surface of the beam leads 28, thus assuring good electrical contact between the tips and the leads. The cantilevered portion of the contact elements 24 overhanging the internal open space of the picture frame-like insulator 22 are shaped in accordance with the principles set forth in the aforementioned U.S. Pat. No. 3,702,439 to McGahey and West.

The probe under consideration in this case, is an improvement of the probe described in the above-mentioned McGahey-West patent. In the presently considered improved version, the insulator 22 and the compensation member 34 are formed as an assembled unit and thus do not need special alignment with respect to one another when the probe assembly 20 is mounted on one of the adapters 32. Additionally, the improved probe assembly 20 disclosed herein, is amenable to being manufactured with automatic assembly steps assuring highly repeatable results without tedious and time consuming manual assembly practices.

The insulator 22 is injection-molded to produce the shape illustrated in FIG. 1. It is desirable to form the insulators 22 from a thermoplastic material, such as optical-grade acrylic.

The compensating member 34 is die cut from a sheet of resilient material such as polyimide or the like. It has been found that polyimide having a thickness of 0.005 inch has proper resiliency to accomplish the desired compensation within the probe assembly 20.

Figure 3:
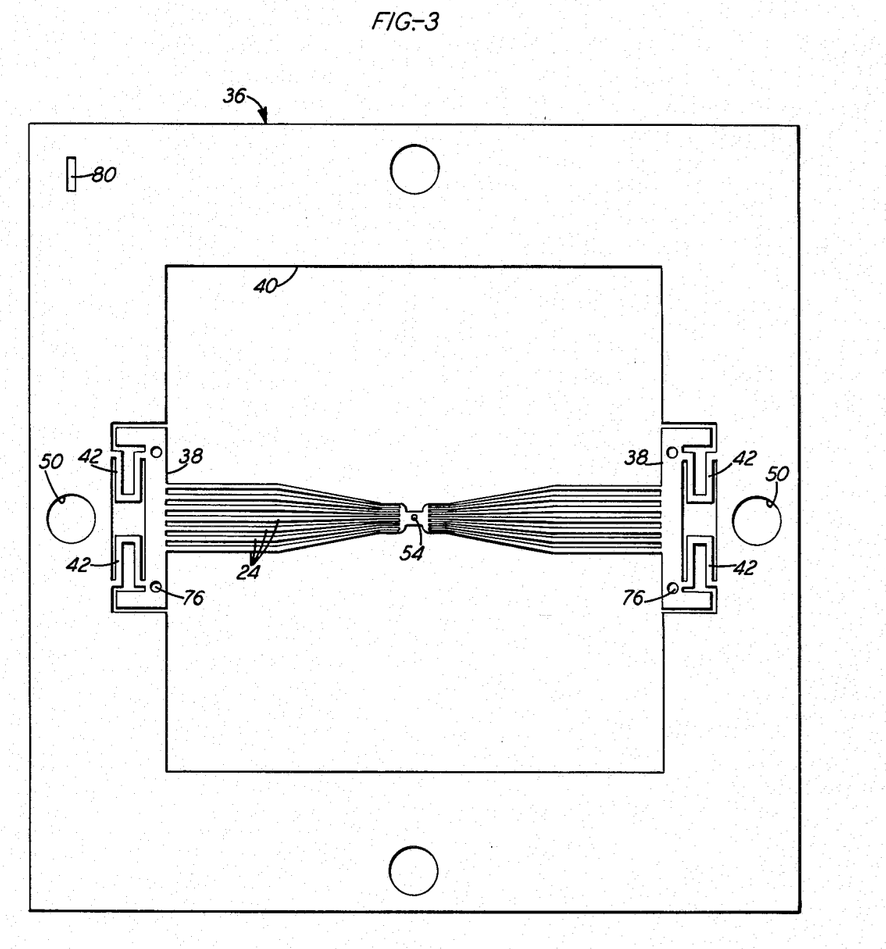
FIG. 3 is a plan view of a probe frame from which contact elements of the probe of FIG. 1 are produced.

The contact elements 24 are formed by photo-etching the elements into a probe-frame, designated generally by the numeral 36, and illustrated in FIG. 3. The contact elements 24 have a typical cross-sectional area of 0.0018 inch × 0.0025 inch. One very desirable material for the contact elements is beryllium-copper alloy.

The probe frame 36 is formed so that the inner ends of the contact elements 24 are joined together in the center. The center joining provides stability of the contact elements 24 in subsequent assembly steps. The elements 24 are joined to a tie bar 38 which is connected to a frame portion 40 with expansion elements 42.

Figure 4:
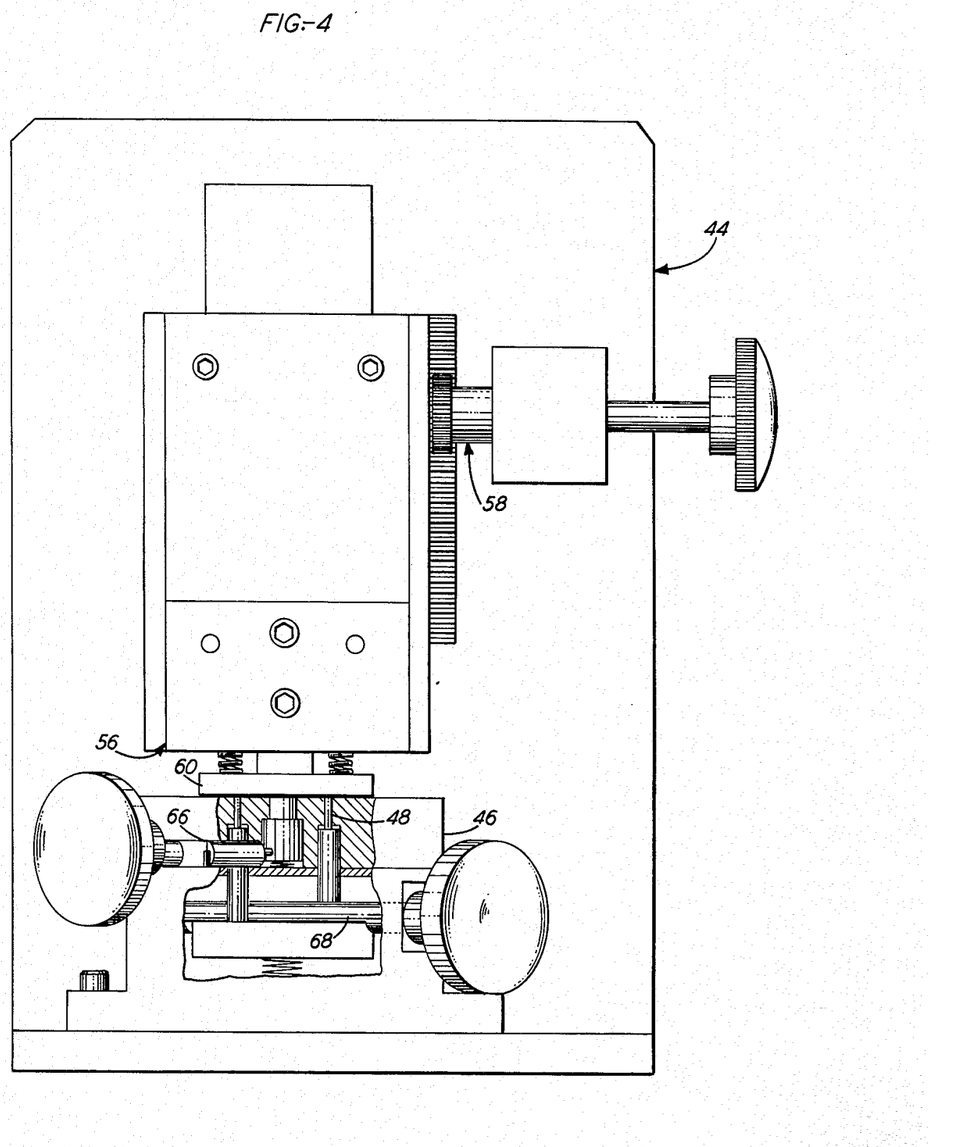
FIG. 4 is an elevational view of a tool for forming the probe frames of FIG. 3.
Figure 5:
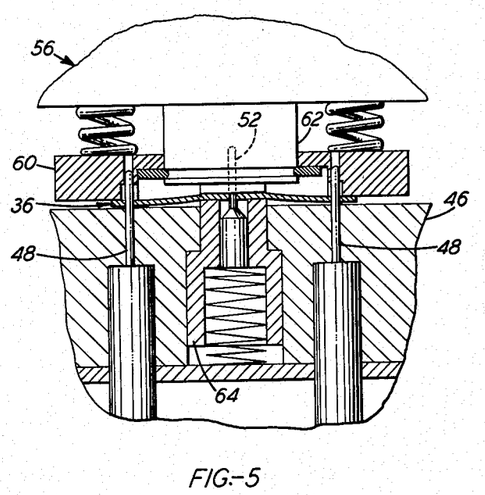
FIGS. 5 and 6 are enlarged views of a working region of the tool of FIG. 4.
Figure 6:
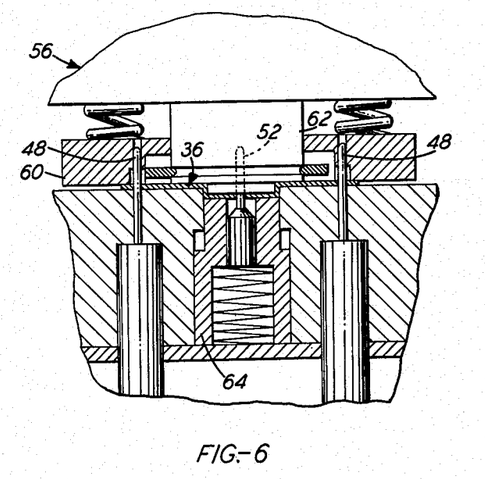

The planar probe frame 36 of FIG. 3 is formed into a three-dimensional configuration in a forming tool, designated generally by the numeral 44, and illustrated in FIGS. 4, 5 and 6. One of the probe frames 36 is placed on a base portion 46. The base portion 46 is provided with alignment pins 48 which engage with alignment holes 50 in the probe frame 36. A central alignment pin 52 engages an alignment hole 54 located in the center of the probe frame 36.

In a first stage of operation, a spring-biased ram assembly, designated generally by the numeral 56, is lowered with a rack and pinion assembly 58. The ram assembly 56 includes an outer clamping member 60 and an inner forming member 62. After initial contact is made between the ram assembly 56 and the probe frame 36, as shown in FIG. 5, continued downward motion of the inner forming member 62 occurs. The member 62 presses a central region of the probe frame 36 into a pocket that develops as a spring-biased pressure pad 64 in the base 46 is depressed. This pressure pad 64 prevents the contact elements 24 from breaking away from their connection points. The forming step is illustrated in FIG. 6.

After the probe frame 36 is formed, a locking pin 66 is engaged with the die member 64 to hold it in its lowered position. The alignment pins 48 are withdrawn downwardly with a cam operator 68. The ram assembly 56 is then raised. Since the alignment pins 48 and the die member 64 are in a lowered position, the formed probe frame 36 can be readily removed from the tool 44.

Figure 7:
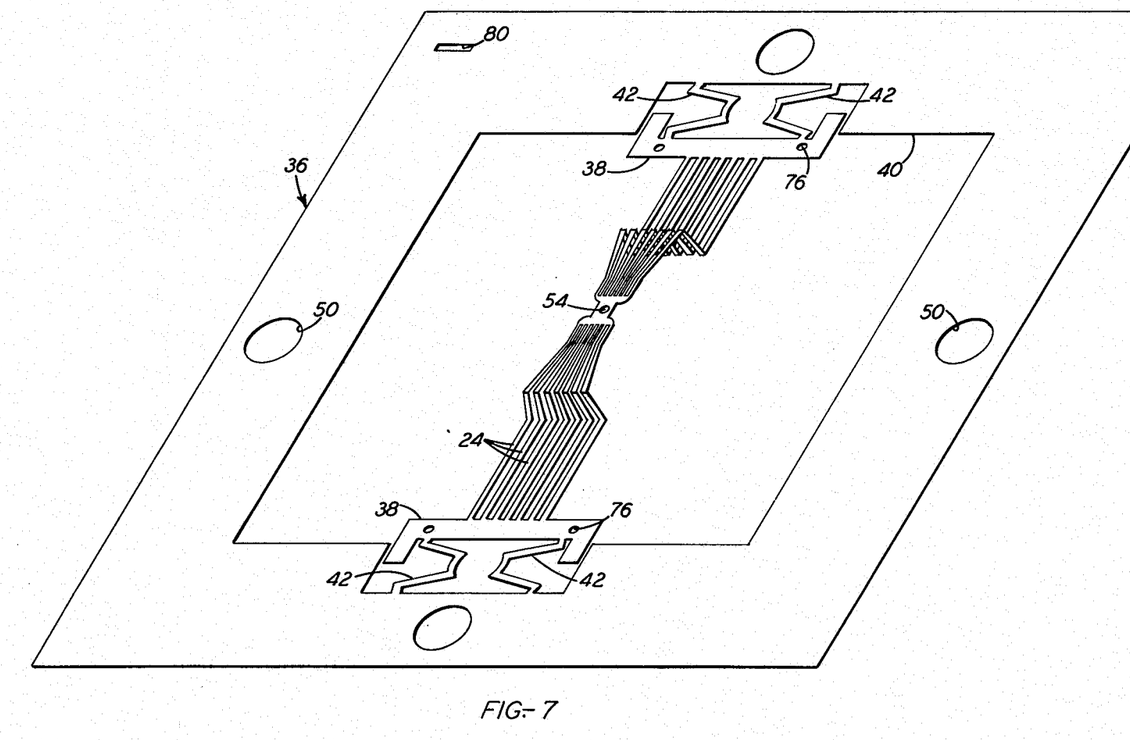
FIG. 7 is a perspective view of the probe frame of FIG. 3 after the probe frame has been formed.

A formed probe frame 36 is illustrated in FIG. 7. The members 42 of the frame 36 have expanded to provide the additional distance from the frame portion 40 to the center alignment hole 54, which is required by the three-dimensional forming of the probe frame 36. The expansion members 42 are made of sufficiently small cross-sectional areas, about 0.0025 inch × about 0.010 inch, so that stretching of the contact elements does not occur during the forming operation.

Figure 8:
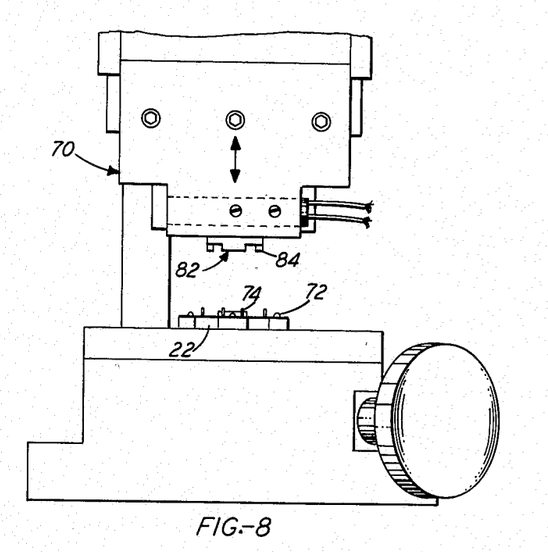
FIGS. 8 and 9 are elevational views of a portion of a tool used to thermally embed contact elements into an insulator portion of the probe of FIG. 1.

Two of the formed probe frames 36 are assembled with one of the insulators 22 and one of the compensating members 34 in a single operation. This operation is performed on a thermal-embedding tool, designated generally by the numeral 70. The insulator 22 is engaged with alignment pins 72. The probe frames 36 are placed over the insulator 22 so that alignment pins 74 engage with alignment holes 76 formed in the tie bars 38 of the probe frames. The center alignment hole 54 of each of the probe frames 36 is also engaged with a center alignment pin 78.

In order to assure that each of the formed probe frames 36 is placed in the same orientation, an operator observes the orientation of a rectangular aperture 80 formed in one corner of the probe frame and assures that the aperture is orientated as needed for consistency. Since the size of the probe 20 is so small, extreme precision is needed in the alignment steps. An inadvertent reversal of one of the probe frames might result in an inaccurate positioning of the contact elements 24 on the insulator 22.

Figure 9:
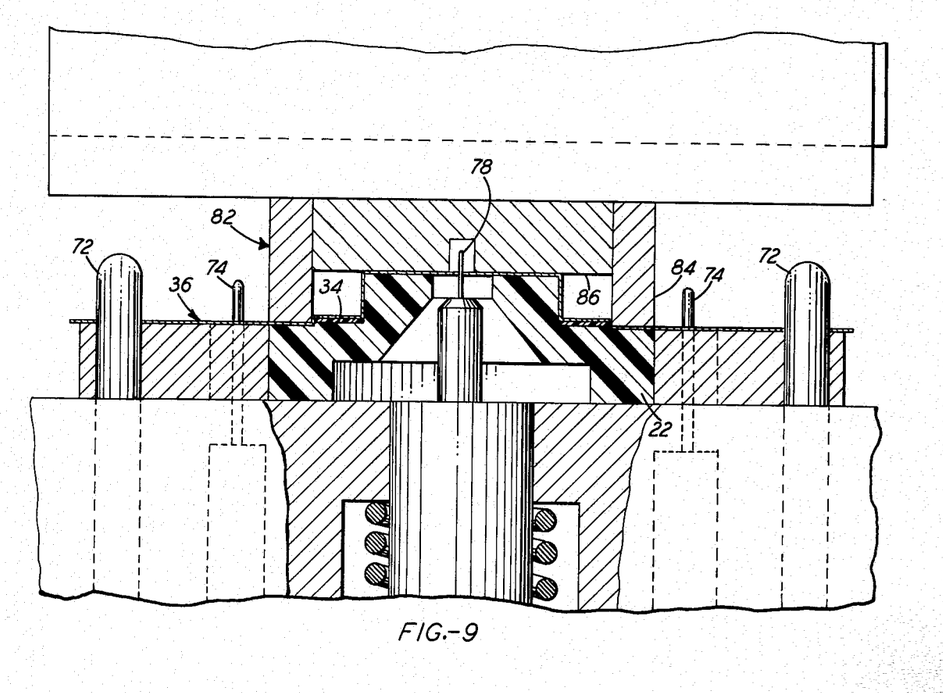

After the insulator 22, compensating member 34 and probe frames 36 are in position on the tool 70, a heated upper member 82 is lowered toward the workpiece. The raising and lowering of the upper member 82 is accomplished with a rack and pinion mechanism (not shown) similar to that used on the forming tool 44. As shown in FIG. 9, the upper member 82 is provided with four short rails 84 which engage the probe frames 36 and insulator 22 outwardly from the compensating members 34. A central region 86 of the member 82 contacts the probe frames 36 and the insulator 22 inwardly from the compensating member 34. The member 82 is maintained at a temperature of 135°C to 140°C. As the member 82 is pressed downwardly against the probe frames 36 and the insulator 22, the contact elements 24 are embedded into the surface of the insulator due to the softening of the thermo-plastic material of the insulator. The compensating member 34 becomes captively held in place by the contact elements 24.

Figure 10:
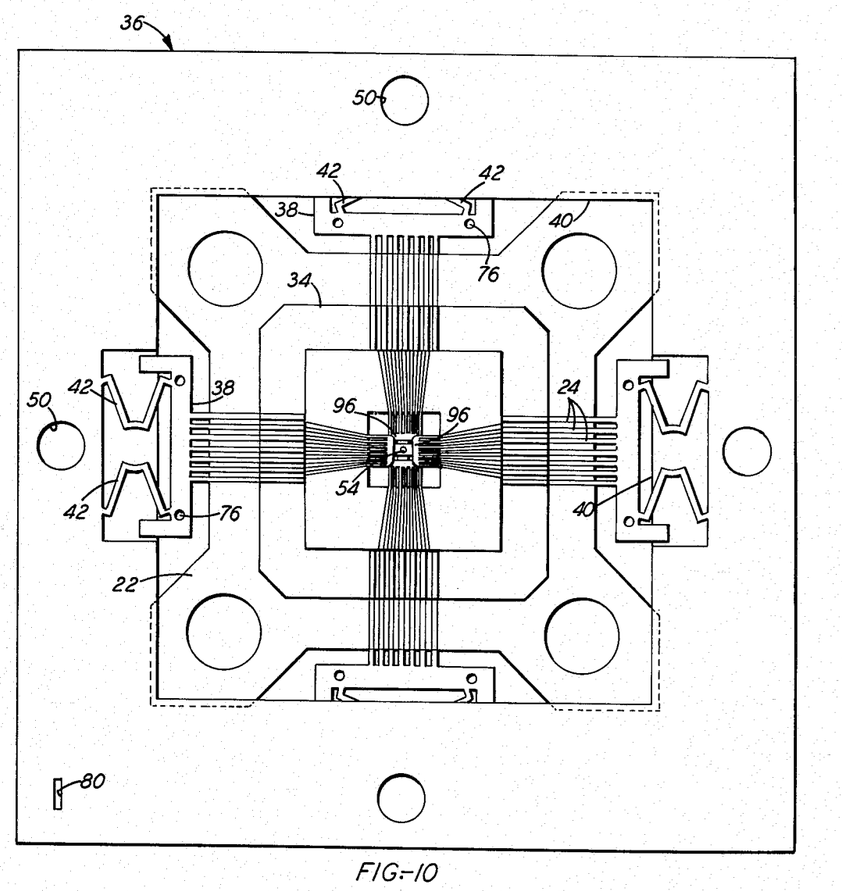
FIG. 10 is a plan view of an insulator with contact elements thermally embedded into its surface.

After the thermal-embedding operation is complete, the alignment pins are withdrawn with a mechanism (not shown) similar to that used on the forming tool 44. After the alignment pins are withdrawn, the insulator 22 can be readily removed from the tool 70. FIG. 10 shows the assembled probe frames 36, compensating member 34 and insulator 22.

Figure 11:
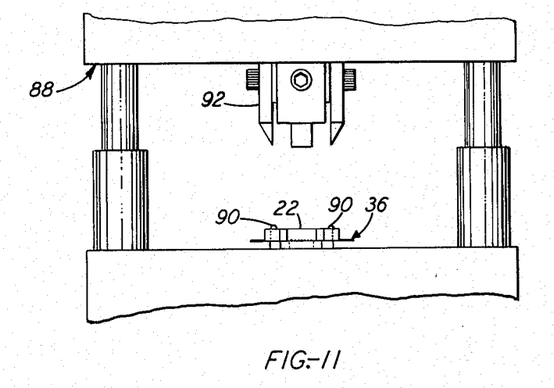
FIGS. 11 and 12 are enlarged partial views of a cutting and trimming tool.
Figure 12:
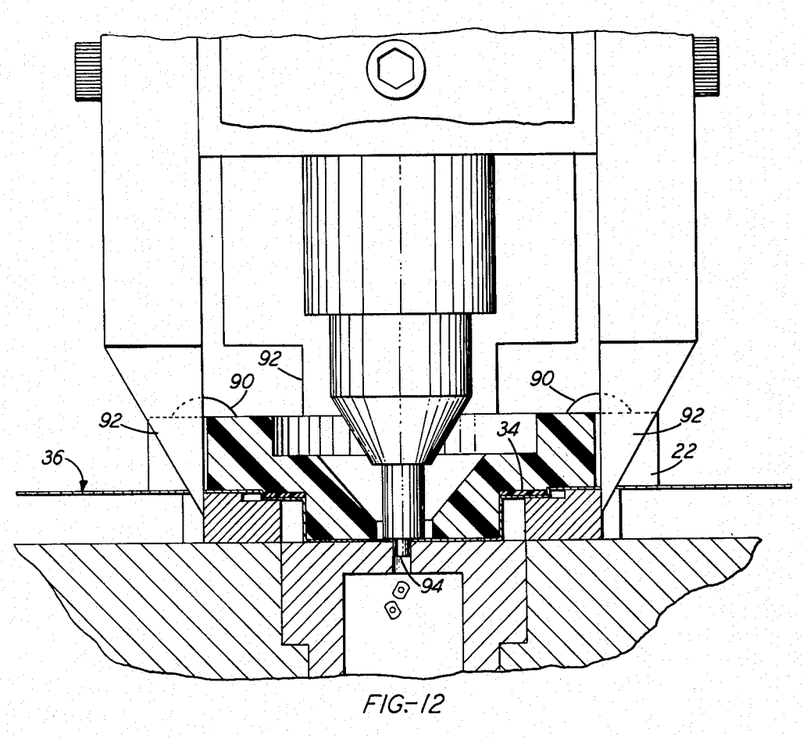
Figure 13:
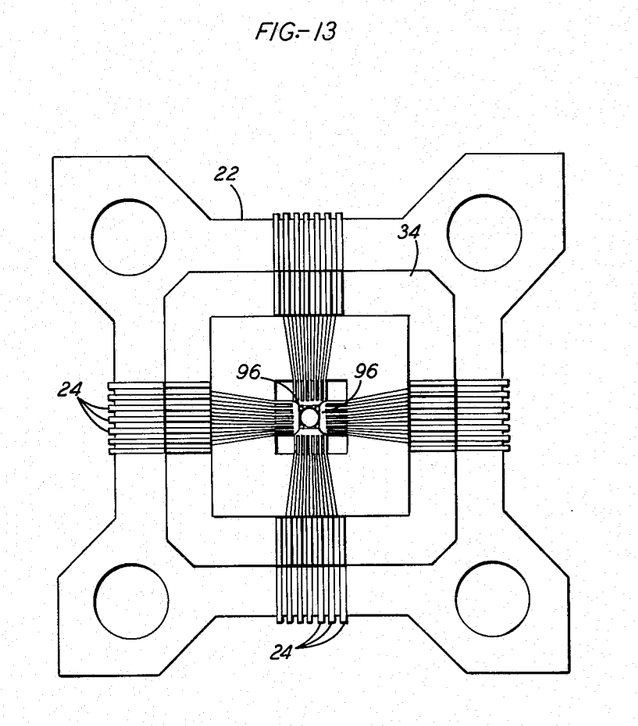
FIG. 13 is a plan view of the insulator and contact elements of FIG. 10 with frame portions of probe frames trimmed away.

Next, a shearing operation is performed on a tool, designated generally by the numeral 88, as illustrated in FIGS. 11 and 12. The insulator 22 and the attached probe frames 36 are placed in the tool 88 on alignment pins 90. A rack and pinion assembly (not shown) similar to that used on the forming tool 44, lowers cutting blades 92 and a center punch 94 into engagement with the probe frames 36. The center punch 94 removes a central region around the hole 54 and separates the contact elements 24 into the four segments which are still held together by a tie bar 96 as shown in FIG. 13. The outer cutting blades 92 trim off the frame portion 40 and the tie bars 38.

Figure 14:
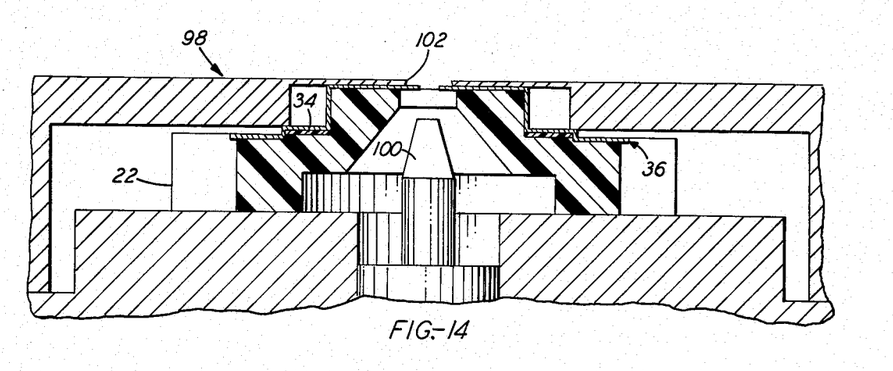
FIGS. 14, 15 and 16 are partial views of a forming and trimming tool used to form the free ends of contact elements into contact tips.
Figure 15:
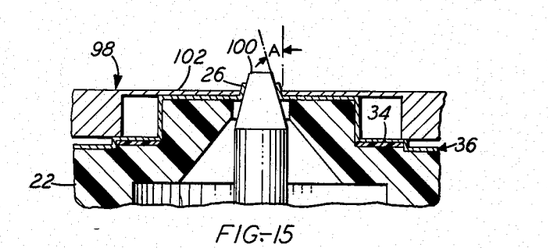

After the shearing operation, the contact elements 24, insulator 22 and compensating member 34 are placed in a tip-forming and trimming tool, designated generally by the numeral 98. The tool 98 includes a vertically movable pyramidal shaping member 100. As the shaping member 100 moves upwardly, the contact elements 24 are bent against a shaping-die member 102 to form the contact tips 26. Each of the four sides of the pyramidal shaping member 100 bends the contact elements 24 at an angle A as shown in FIG. 15. A desirable value of the angle A for successful operation of the probe 20 is 15° to 30°.

Figure 16:
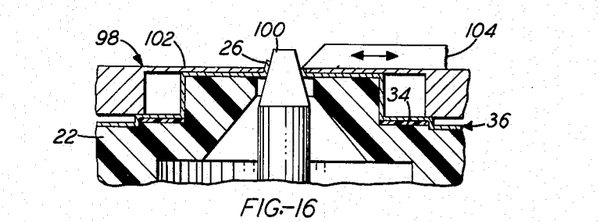

After the contact elements 24 are bent to form contact tips 26, a knife blade 104 is slid inwardly along the top surface of the forming die 102 to trim excess material from the ends of the contact tips 26. The excess material includes the tie bars 96. As shown in FIG. 16, the knife blade 104 is pressed against the contact tips 26 while the shaping member 100 is still in its upper position. Thus, the shaping member 100 operates as an anvil against which the knife blade 104 exerts a cutting force. Removal of the tie bars 96, of course, results in the contact tips being made independent of one another as they are shown in FIGS. 1 and 2.

Figure 17:
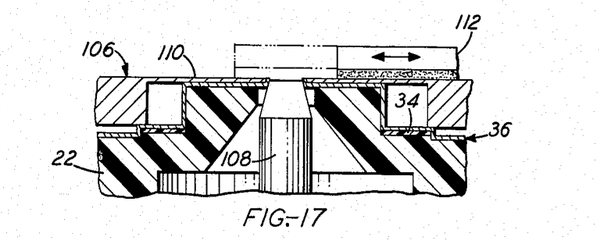
FIG. 17 is a partial sectional view of a lapping tool used for finishing the ends of the contact tips.

A final polishing or lapping operation is performed in a lapping tool, designated generally by the numeral 106, illustrated in FIG. 17. The lapping tool 106 includes a pyramidal member 108 and a holding die 110. The pyramidal member 108 holds the contact tips 26 captive between itself and the die 110 so that the free ends of the contact tips 26 can be lapped with an abrasive block 112. After the tips 26 are lapped in the tool 106, they are free of any burrs which might have developed during the cutting operation.

Although certain embodiments of the invention have been shown in the drawings and described in the specification, it is to be understood that the invention is not limited thereto, is capable of modification and can be arranged without departing from the spirit and scope of the invention.

What is claimed is:

1. A method of producing a test probe having a plurality of cantilevered contact elements supported on an insulator in a desired array with the free ends of the elements adapted to contact individual leads of an article to be tested, which comprises the steps of:
   forming the contact elements by photo-etching a planar metallic member to produce a frame portion and an expandable portion connecting the contact elements with the frame portion; and
   shaping the contact elements into a non-planar configuration while holding the frame portion, said shaping being facilitated by an increase in length of the expandable portion.

2. A method of producing a test probe wherein a plurality of cantilevered contact elements are supported on an insulator in a desired array with the free ends of the elements adapted to contact individual leads of an article to be tested and the fixed ends of the elements are adapted to contact a planar test-set input connector, comprising the steps of:
   clamping the insulator while permitting a portion of the cantilevered elements to extend out of the clamp arrangement;
   bending the unclamped portions of the cantilevered elements by sliding a member, having an inclined bearing face, perpendicularly to the plane on which the cantilevered elements are clamped so that the unclamped portions of the elements are held by the slidable member; and
   moving a cut-off blade against the slidable member in the plane of the clamped elements to cut-away excess portions of the free ends of the elements which have been bent by the said member, whereby a desired shaping of the free ends of the contact elements is achieved.

3. The method of producing test probes of claim 2 wherein the insulator has a picture-frame configuration with an open center portion and all of the free ends of the contact elements extend into the open center portion;
   wherein the slidable member has a pyramidal configuration and is inserted through the center of the insulator member; and
   wherein cut-off blades are operated against all of the inclined faces of the sliding member.

4. A method of producing a test probe having a plurality of cantilevered contact elements supported on an insulator in a desired array with the free ends of the elements adapted to contact individual leads of an article to be tested, which comprises the steps of:
   forming the contact elements by photo-etching a planar metallic member to produce a frame portion and an expansion portion connecting the contact elements with the frame portion;
   shaping the contact elements into a non-planar configuration while holding the frame portion, said shaping being facilitated by an increase in length of the expansion portion;
   heating at least localized portions of the insulator;
   pressing portions of the contact elements against the heated portions of the insulator to embed the elements into the surface of the insulator;
   clamping the insulator while permitting a portion of the cantilevered elements to extend out of the clamp arrangement;
   bending the unclamped portions of the cantilevered elements by sliding a member, having an inclined bearing face, perpendicularly to the plane on which the cantilevered elements are clamped so that the unclamped portions of the elements are held by the slidable member; and
   moving a cut-off blade against the slidable member in the plane of the clamped elements to cut-away excess portions of the free ends of the elements which have been bent by the said member, whereby a desired shaping of the free ends of the contact elements is achieved.

5. A method of producing a test probe having a plurality of cantilevered contact elements supported on an insulator in a desired array with the ends of the elements adapted to contact individual leads of an article to be tested, comprising the steps of:

selectively removing portions of a planar conductive member to produce the contact elements, a frame portion and an expandable portion connecting the contact elements with the frame portion; and shaping the contact elements into a non-planar configuration while holding the frame portion, said shaping being facilitated by an increase in length of the expandable portion.

6. A method as recited in claim 5 wherein the portions of the planar conductive member are selectively removed by photo-etching.

7. A method as recited in claim 5 further comprising: affixing the contact elements to an insulating frame while said elements are held in fixed relative position by the frame portion and expandable portion.

8. The method of producing a test probe of claim 7 wherein:

a resilient member is disposed between the insulator, the contact elements, and portions of the contact elements adjacent the resilient member are embedded in the insulator material to hold the resilient member captive, whereby, when the test probe is connected to the planar test-set input connector, low impedance electrical contact is assured between all of the contact elements and the corresponding portions of the connector.

9. A method as recited in claim 7 further comprising the step of severing the elements from the frame portion and expandable portion.

10. A method as recited in claim 5 further comprising:

heating at least localized portions of the insulator; and pressing portions of the contact elements against the heated portions of the insulator to embed the portions into the surface of the insulator such that other portions of the contact elements are cantilevered from the insulator.

11. A method as recited in claim 10 wherein the heating is accomplished by pressing the portions of the contact elements against the insulator with a heated member.

12. A method as recited in claim 10 further comprising:

bending the cantilevered portions of the contact elements by sliding a member having an inclined bearing face perpendicularly to the plane in which the cantilevered elements are embedded;

moving a cut-off blade against the slidable member in a plane parallel to the plane of the embedded elements to cut away excess portions of the ends of the cantilevered elements, whereby a desired shaping of the ends of the contact elements is achieved.

13. A method as recited in claim 12 wherein the slidable member has a pyramidal configuration and is inserted through a central opening in the insulator.

14. A method as recited in claim 13 wherein the cut-off blades are operated simultaneously against all of the cantilevered elements.

15. A method as recited in claim 5 wherein the insulator is annular in shape with a central opening and a pair of opposed surfaces generally parallel to each other and wherein one of said opposed surfaces has two generally concentric levels, the inner concentric level protruding relative to the outer concentric level, and comprising the additional step of:

embedding a portion of each of the contact elements in both levels of said insulator.

* * * * *